(12) United States Patent
Yang (10) Patent No.: US 11,124,017 B2
(45) Date of Patent: Sep. 21, 2021

(54) COMPOSITE STONE PANEL AND MANUFACTURING METHOD THEREOF

(71) Applicant: Jianqiao Yang, Ca (CA)

(72) Inventor: Jianqiao Yang, Ca (CA)

( * ) Notice: Subject to any disclaimer, the term of this patent is extended or adjusted under 35 U.S.C. 154(b) by 0 days.

(21) Appl. No.: 16/961,641

(22) PCT Filed: Aug. 22, 2018

(86) PCT No.: PCT/CN2018/101707
§ 371 (c)(1),
(2) Date: Jul. 10, 2020

(87) PCT Pub. No.: WO2019/140904
PCT Pub. Date: Jul. 25, 2019

(65) Prior Publication Data
US 2020/0338923 A1    Oct. 29, 2020

(30) Foreign Application Priority Data

Jan. 22, 2018 (CN) .......................... 201810060428.3

(51) Int. Cl.
| | | |
|---|---|---|
| *B44C 5/04* | (2006.01) |
| *B44C 1/22* | (2006.01) |
| *B44C 3/10* | (2006.01) |
| *B44F 1/06* | (2006.01) |
| *G09F 13/04* | (2006.01) |
| *G09F 13/20* | (2006.01) |
| *F21V 9/30* | (2018.01) |
| *F21V 9/08* | (2018.01) |
| *F21V 33/00* | (2006.01) |
| *F21Y 115/10* | (2016.01) |

(52) U.S. Cl.
CPC ............ *B44C 5/0438* (2013.01); *B44C 1/225* (2013.01); *B44C 3/10* (2013.01); *B44F 1/06* (2013.01); *F21V 9/08* (2013.01); *F21V 9/30* (2018.02); *F21V 33/0004* (2013.01); *F21Y 2115/10* (2016.08); *G09F 13/04* (2013.01); *G09F 13/20* (2013.01)

(58) Field of Classification Search
None
See application file for complete search history.

(56) References Cited

FOREIGN PATENT DOCUMENTS

| | | | |
|---|---|---|---|
| CN | 1249243 | A | 4/2000 |
| CN | 2578115 | Y | 10/2003 |
| CN | 1583429 | A | 2/2005 |
| CN | 102254907 | A | 11/2011 |
| CN | 202055438 | U | 11/2011 |
| CN | 103806633 | A | 5/2014 |
| CN | 103938816 | A | 7/2014 |
| CN | 206034831 | U | 3/2017 |

(Continued)

*Primary Examiner* — Britt D Hanley (57) ABSTRACT

A composite stone panel (1) is provided. The composite stone panel (1) comprises a front panel and a backing panel. The back of the front panel comprises a counter-relief image (11) filled with a light-transmitting reinforcing filler and is attached to the backing panel. The backing panel comprises a light source (6) or an opening for receiving the light source (6). The light source (6) or opening is positioned to transmit light towards the counter-relief image (11). A relief (3) is then formed at the front of the composite stone panel (1). The relief (3) is positioned opposite to the counter-relief image (11).

20 Claims, 6 Drawing Sheets

(56) References Cited

FOREIGN PATENT DOCUMENTS

| | | | |
|---|---|---|---|
| CN | 107150548 | A | 9/2017 |
| CN | 108045151 | A | 5/2018 |
| CN | 208184133 | U | 12/2018 |
| DE | 102014117273 | A1 | 5/2016 |
| EP | 538376 | B1 | 6/1996 |
| ES | 2023742 | A6 | 2/1992 |
| KR | 20090099598 | A * | 9/2009 |

\* cited by examiner

COMPOSITE STONE PANEL AND MANUFACTURING METHOD THEREOF

CROSS-REFERENCE TO RELATED APPLICATIONS

This application is a U.S. National Phase Application under 35 U.S.C. § 371 of International Application No. PCT/CN2018/101707 filed Aug. 22, 2018, which claims the benefit of and priority to Chinese Patent Application CN 201810060428.3, filed on Jan. 22, 2018, entitled "Natural stone relief decorative panel and manufacturing method thereof", which both prior applications are incorporated herein by reference in their entirety.

FIELD OF THE INVENTION

The present invention relates to the field of stone panels, and in particular, to natural stone panels with relief sculpture and manufacturing methods thereof.

BACKGROUND OF THE INVENTION

Conventionally, natural stone relief products have been favored by consumers due to their good decorative effect. Natural stone relief products with light-transmitting reliefs are particularly preferred due to their decorative effects. As most natural stone materials have limited light transmittance, the relief can be thinned, such as by engraving at the back of the relief, to improve its light transmissivity. It is typical to first carve out a counter-relief at the back of the natural stone panel, and then carve out a relief image at the front of the panel, opposite to the counter-relief.

SUMMARY OF THE INVENTION

The present inventor has recognized that thin stone panels are easy to break during a conventional manufacturing process, particularly when carving the front relief after the back counter-relief has been formed, which increases manufacturing and material costs.

It is thus desirable to provide natural stone panels with relief sculpture and methods for manufacturing such panels, which reduces the risk of breaking the relief during the manufacturing process, thereby saving costs and reducing material waste.

Accordingly, the present disclosure discloses the following technical solutions.

In an aspect of the present disclosure, there is provided a method comprising providing a composite stone panel comprising a front panel and a backing panel, wherein the front panel comprises natural stone having a front and a back, the back of the front panel comprises a counter-relief filled with a light-transmitting reinforcing filler, and the backing panel is attached to the back of the front panel; and carving the natural stone from the front of the composite stone panel to form a relief at the front positioned opposite to the counter-relief at the back of the natural stone. Providing the composite stone panel may comprise engraving the back of the natural stone to form the counter-relief; filling the counter-relief with the light-transmitting reinforcing filler and bonding the light-transmitting reinforcing filler to the natural stone; and attaching the backing panel to the front panel. The counter-relief may be filled with a curable light-transmitting adhesive material, which may be then cured to form the light-transmitting reinforcing filler and the light-transmitting reinforcing filler is bonded to the natural stone. The adhesive material may be cured in the counter-relief before attaching the backing panel to the front panel. The adhesive material may comprise an epoxy resin, a polyurethane adhesive, or an unsaturated polyester resin adhesive, and may further comprise a curing agent. The front panel and the backing panel may be bonded to each other by an adhesive. The relief may be polished. The front of the natural stone may also be polished before carving the natural stone to form the relief at the front. The polishing may comprise treating a front surface of the natural stone with a chemical solution. A light source or a light guide may be disposed in the counter-relief for illuminating the relief. A photoluminescent material or a colorant may be disposed in the counter-relief. The light-transmitting reinforcing filler may be transparent. A reinforcing bar may be disposed in the counter-relief for reinforcing the natural stone, before the counter-relief is filled with the light-transmitting reinforcing filler. The backing panel may comprise a tile, a cementitious panel, a glass panel, or a cellular panel.

In a further aspect of the disclosure, there is provided a composite stone panel comprising: a front panel comprising natural stone and having a front and a back; and a backing panel attached to the back of the front panel; wherein the front of the front panel comprises a relief, the back of the front panel has a counter-relief opposite to the relief at the front, the counter-relief filled with a light-transmitting reinforcing filler. The composite stone panel may comprise a light source configured and positioned for illuminating the relief through the counter-relief. The light source may be disposed in the counter-relief, or the front panel may comprise a light guide disposed in the counter-relief and connected to the light source. The backing panel may comprise an opening aligned with the counter-relief for receiving a light source to illuminate the relief through the counter-relief. The composite stone panel may further comprise an electrical wire for connecting the light source to a power source. The composite stone panel may comprise a battery holder for holding a battery, and the battery may be used as a power source for the light source. The front panel and the backing panel may be bonded to each other by an adhesive. The light transmitting reinforcing filler may be transparent. The composite stone panel may further comprise a photoluminescent material or a colorant in the counter-relief. The backing panel may comprise a tile, a cementitious panel, a glass panel, or a cellular panel. The composite stone panel may further comprise a reinforcing bar in the counter-relief. The light transmitting reinforcing filler may be formed of a cured epoxy resin, polyurethane adhesive, or unsaturated polyester resin adhesive. The relief may have a flat or curved front surface.

In another aspect, the present disclosure provides a method for manufacturing a natural stone relief panel. The method comprises the following steps.

In Step 1), a counter-relief image is produced on a back surface of the natural stone panel.

In Step 2), the counter-relief image is filled (may not be fully filled) with a curable clear glue.

In Step 3), after the clear glue is cured, the stone panel and a rear panel are fixed together with an adhesive. The rear panel is provided at a position thereof corresponding to the counter-relief with a light source or with a hole for mounting the light source.

In Step 4), after the adhesive for fixing the stone panel and the rear panel together is fully cured, a relief image corresponding to the counter-relief image is produced on a front surface of the stone panel (thickness of the stone at the relief is determined according to light transmittance of the natural stone).

In Step 5), the relief image is polished.

In Step 6), the production of the natural stone relief decorative panel is completed.

Regarding the providing of the hole for mounting the light source on the rear panel at the position corresponding to the counter-relief, specifically, a blind hole (namely a hole not penetrating through the rear panel) may be provided on one side of the rear panel facing the stone panel, so that the light source can be provided in the hole. In this way, the inside of the counter-relief image can be fully filled with the clear glue and there is no need to reserve installation space for the light source. In addition, the light source in this case are further away from surface of the relief image, which can effectively avoid occurrence of light spots on the surface of the relief image, thus improving the aesthetic effect of the product.

According to the above solution, before the counter-relief image is filled with the curable clear glue, a photoluminescent material and/or pigment is applied to an inner surface of the counter-relief image to give the natural stone relief decorative panel a better decorative effect.

According to the above solution, a light guide strip or a light guide bar may be installed in the counter-relief image, and a light source may be disposed at an edge of the stone panel and at a position in communication with the counter-relief image.

According to the above solution, an electrical wire connected to the light source passes through an etched slot or opening in the rear panel and is connected to a power switch or/and a time controller. The light source can be connected to an external power source, which increases the practical applicability thereof, and enables the light source to emit light more permanently, so as to ensure a decorative effect.

According to the above solution, when the surface of the relief image is flat, the sequence of steps of the manufacturing method may be Step 5, Step 1, Step 2, Step 3, Step 4, and Step 6. In other words, when the surface of the relief image is flat, the surface of the relief image may be polished prior to the production of the counter-relief image. Further, when the surface of the relief image does not need to be polished, the step of polishing may be omitted.

According to the above solution, in step 2, the clear glue can be replaced by a non-transparent but light-transmitting glue. This may decrease light transmittance of the glue, but to some extent helps to reduce light spots.

According to the above solution, in step 5, manual polishing of the relief image can be omitted by immersing the relief decorative panel in a chemical solution (for example hydrochloric acid). This can reduce labor cost.

According to the above solution, before the counter-relief image is filled with the curable clear glue, a stiffener for reinforcing the structure of the counter-relief image and the relief image is provided in the counter-relief image. Preferably, the stiffener may be metal strips, for example steel strips. Since the stiffener is arranged in the counter-relief image, it does not affect the aesthetic effect of the relief image while reinforcing the structural strength of the relief portion so that the relief image is not easily broken, thus saving costs.

According to the above solution, before the counter-relief image is filled with the curable clear glue, a heating unit is disposed in the counter-relief image and then waterproofed. By providing the heating unit within the counter-relief image, the use of the natural stone relief decorative panel can be greatly expanded. For example, the natural stone relief decorative panel can be used for ground or table, etc., giving users a pleasant feeling.

The present disclosure further discloses a natural stone relief decorative panel, which comprises a natural stone panel. The natural stone panel is provided on a back surface thereof with a counter-relief image which is filled with a curable clear glue. The natural stone panel is provided on a front surface thereof with a relief image corresponding to the counter-relief image.

According to the above solution, a light source is provided at the counter-relief image to give the natural stone relief decorative panel a better decorative effect.

According to the above solution, the light source is connected to one end of an electric wire. Another end of the electric wire is connected to a power switch or/and a time controller. The time controller controls the light source to periodically emit light so as to give the natural stone relief decorative panel a better decorative effect.

According to the above solution, the back surface of the natural stone panel is attached to a rear panel via glue or is connected to the rear panel via a connector, which ensures that the natural stone panel is not easily broken. The rear panel is provided with a light source at a position corresponding to the counter-relief image, which is easy to produce. Alternatively, a hole for mounting the light source is provided on the rear panel at a position corresponding to the counter-relief image. When the rear panel is provided with the hole for mounting the light source at the position corresponding to the counter-relief image, the light source may not be mounted when the stone panel and the rear panel are fixed together, so as to avoid damage to the light source during the process of fixing the stone panel to the rear panel. Alternatively, a light source may be provided at the counter-relief image. The light source is connected to a power source. The power source can be a built-in power source or an external power source. According to the above solution, the rear panel can be one of a tile, a cementitious panel, a glass panel, and a cellular panel.

According to the above solution, a pigment or paint is provided between the curable clear glue and the counter-relief image or between the curable clear glue and the light source, so as to give the natural stone relief decorative panel a better decorative effect.

According to the above solution, a photoluminescent material is provided between the curable clear glue and the counter-relief image or between the curable clear glue and the light source, so as to give the natural stone relief decorative panel a better decorative effect.

According to the above solution, the clear glue can be replaced by a non-transparent but light-transmitting glue, which may decrease light transmittance of the glue, but to some extent helps to reduce light spots.

According to the above solution, a light guide strip or a light guide bar is mounted in the counter-relief image, and the light source is arranged at an edge of the stone panel and at a position in communication with the counter-relief image. Since the light source is located at the edge of the stone panel, it is convenient to replace the light source. Besides, the light guide strip or the light guide bar may make the light in the counter-relief image more uniform and avoid the occurrence of light spots.

According to the above solution, the curable clear glue may be an epoxy resin adhesive made of an epoxy resin and a curing agent. The light source may be an ultraviolet light-emitting diode. The relief image is produced by cutting the natural stone panel and has a flat surface or a curved surface. When the relief image has a flat surface, it can be used for pictures hanging on walls, and when it has a curved surface, it can be used for furniture, or on cylindrical or curved walls.

An embodiment of the present disclosure may have one or more of the following advantageous effects.

After the production of the counter-relief image on the natural stone panel, the counter-relief image is filled with the curable clear glue, which ensures that when the relief image corresponding to the counter-relief image is produced, the relief image does not easily break, and meanwhile ensures that the light emitted by the light source on the back surface of the natural stone panel can be transmitted out of the relief image on the front surface of the natural stone panel. In addition, in order to further avoid fracturing of the relief image, a stiffener may be provided in the counter-relief image. Furthermore, by providing a heating unit in the counter-relief image, the use of the natural stone relief decorative panel can be greatly expanded.

BRIEF DESCRIPTION OF THE DRAWINGS

The present invention will be further described in conjunction with the accompanying drawings and embodiments, in which.

In the drawings, same reference numerals are used for same parts. The drawings are not to scale.

Reference numerals: 1. natural stone panel; 2. rear panel; 3. relief; 4. curable clear glue; 5. photoluminescent material; 6. light source; 7. time controller; 8. pigment layer or paint layer; 9. electrical wire; 10. power source; 11. counter-relief image; 12. hole.

DETAILED DESCRIPTION OF THE EMBODIMENTS

Embodiments of the present disclosure will be further described in more detail below with reference to the drawings and depicted embodiments. It should be understood that the specific embodiments described herein are merely intended to explain the present invention and are not intended to limit the present invention.

In an embodiment, a method for manufacturing a natural stone relief decorative panel comprises the following steps.

In Step 1), a counter-relief image 11 is produced on a back surface of the natural stone panel 1.

In Step 2), the counter-relief image 11 is filled (may not be fully filled) with a curable clear glue.

In Step 3), after the clear glue is cured, the stone panel 1 and a rear panel 2 are fixed together with an adhesive. The rear panel 2 is provided at a position thereof corresponding to the counter-relief 11 with a light source or with a hole 12 for mounting the light source. In other words, when the rear panel 2 is provided with the hole 12 for mounting the light source at the position corresponding to the counter-relief image 11, the light source 6 may not be mounted when the stone panel 1 and the rear panel 2 are fixed together, so as to avoid damage to the light source 6 during the process of fixing the stone panel 1 to the rear panel 2.

In addition, an electrical wire connected to the light source 6 passes through an etched slot or opening in the rear panel 2 and is connected to a power switch or/and a time controller. The time controller controls the light source to periodically emit light. The light source can be connected to an external power source, which increases the practical applicability thereof, and enables the light source to emit light more permanently, so as to ensure a decorative effect. Specifically, the time controller is mainly used for controlling an ultraviolet light-emitting diode to excite a photoluminescent material in the counter-relief image. For example, the time controller may be set to be on for 5 seconds, and then off for 15 minutes (the photoluminescent material is thus excited to emit light), and then on for 5 seconds, and so on. The power-on time is very short compared to the power-off time, i.e., there is no need for power most of the time, and it is therefore very power-saving. Energy is thus effectively saved and the cost of use is reduced.

In Step 4), after the adhesive for fixing the stone panel 1 and the rear panel 2 together is fully cured, a relief image 3 corresponding to the counter-relief image 11 is produced on a front surface of the stone panel 1 (thickness of the stone at the relief is determined according to light transmittance of the natural stone).

In Step 5), the relief image 3 is polished.

In Step 6), the production of the natural stone relief decorative panel is completed.

Figure 6:
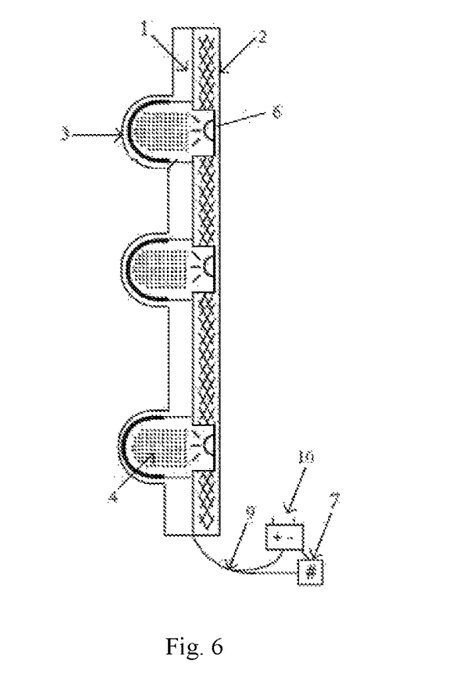
FIG. 6 is a schematic structural diagram of a natural stone relief decorative panel according to a sixth embodiment.

Regarding the issue of providing the hole 12 for mounting the light source on the rear panel 2 at the position corresponding to the counter-relief 11, specifically, a blind hole 12 (namely a hole not penetrating through the rear panel; see FIG. 6) may be provided on one side of the rear panel 2 facing the stone panel 1, so that the light source 6 can be provided in the hole 12. In this way, the inside of the counter-relief image 11 can be fully filled with the clear glue and there is no need to reserve installation space for the light source 6. In addition, the light source 6 in this case are further away from surface of the relief image 3, which can effectively avoid occurrence of light spots on the surface of the relief image 3, thus improving the aesthetic effect of the product.

Before the counter-relief image 11 is filled with the curable clear glue, a photoluminescent material and/or pigment is applied to an inner surface of the counter-relief image 11 to give the natural stone relief decorative panel a better decorative effect.

In addition, as an alternative, a light guide strip or a light guide bar may be installed in the counter-relief image 11, and a light source (for example, a light-emitting diode) may be disposed at an edge of the stone panel 1 and at a position in communication with the counter-relief image 11. In this way, light emitted by the light source may be introduced into the counter-relief image 11 through the light guide strip. Since the light source is located at the edge of the stone panel, it is convenient to replace the light source. Besides, the light guide strip or the light guide bar may make the light in the counter-relief image 11 more uniform and avoid the occurrence of light spots.

Figure 7:
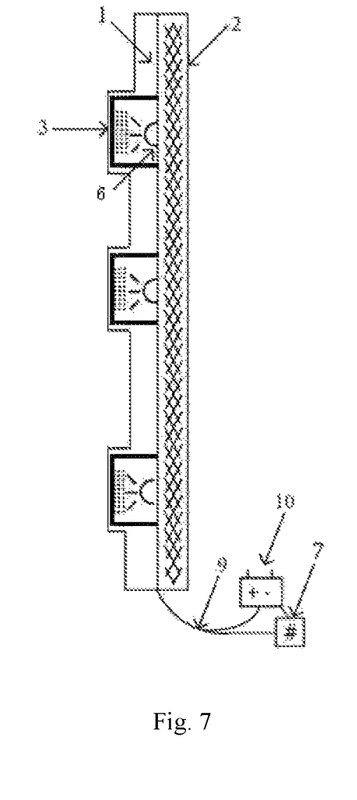
FIG. 7 is a schematic structural diagram of a natural stone relief decorative panel according to a seventh embodiment.

Preferably, the sequence of steps of the manufacturing method may be Step 5, Step 1, Step 2, Step 3, Step 4, and Step 6 when the surface of the relief image is flat (as shown in FIG. 7). In other words, when the surface of the relief image is flat, the surface of the relief image may be polished prior to the production of the counter-relief image. Further, when the surface of the relief image does not need to be polished, the step of polishing may be omitted.

Preferably, in step 2, the clear glue can be replaced by a non-transparent but light-transmitting glue. This may decrease light transmittance of the glue, but to some extent helps to reduce light spots.

Preferably, in step 5, processing of the relief image is achieved by immersing the relief decorative panel in a chemical solution.

Preferably, before the counter-relief image is filled with the curable clear glue, a stiffener for reinforcing the structure of the counter-relief image and the relief image is provided in the counter-relief image. Preferably, the stiffener may be metal strips, for example steel strips. Since the stiffener is arranged in the counter-relief image, it does not affect the aesthetic effect of the relief image while reinforcing the structural strength of the relief portion so that the relief image is not easily broken, thus saving costs.

Preferably, before the counter-relief image is filled with the curable clear glue, a heating unit is disposed in the counter-relief image and then waterproofed. By providing the heating unit within the counter-relief image, the use of the natural stone relief decorative panel can be greatly expanded. For example, the natural stone relief decorative panel can be used for ground or table, etc., giving users a pleasant feeling.

The present disclosure further discloses a natural stone relief decorative panel.

Figure 1:
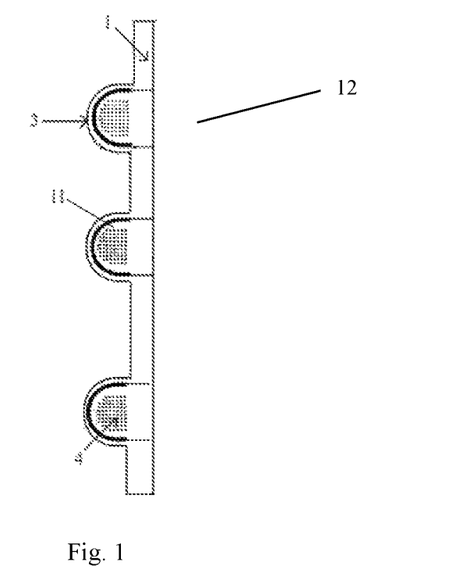
FIG. 1 is a schematic structural diagram of a natural stone relief decorative panel according to a first embodiment.

Embodiment 1 (see FIG. 1) provides a natural stone relief decorative panel which comprises a natural stone panel 1. The natural stone panel 1 is provided on a back surface thereof with a counter-relief image 11 which is filled with a curable clear glue 4. The natural stone panel 1 is provided on a front surface thereof with a relief image 3 corresponding to the counter-relief image 11.

Figure 2:
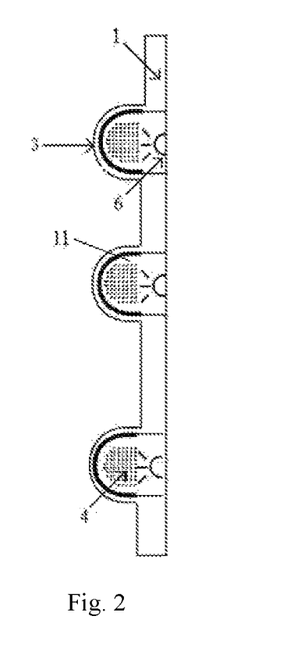
FIG. 2 is a schematic structural diagram of a natural stone relief decorative panel according to a second embodiment.

Embodiment 2 (see FIG. 2) differs from Embodiment 1 in that a light source 6 is provided at the counter-relief image 11. The light source 6 is fixed on the natural stone panel through a bracket. The light source 6 is connected to one end of an electric wire. Another end of the electric wire is connected to a power switch or/and a time controller. The time controller controls the light source to periodically emit light. The light source 6 is connected to the power source through the electric wire. The power source may be a built-in power source or an external power source. The clear glue can be replaced by a non-transparent but light-transmitting glue. This may decrease light transmittance of the glue, but to some extent helps to reduce light spots.

Figure 3:
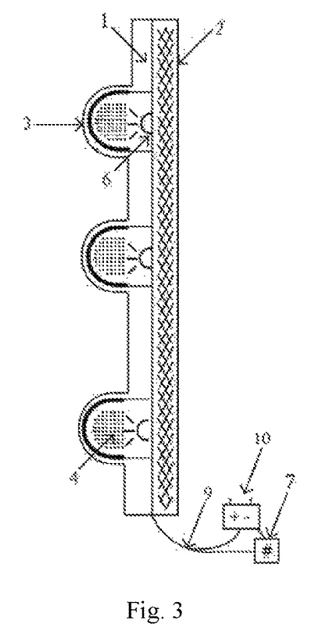
FIG. 3 is a schematic structural diagram of a natural stone relief decorative panel according to a third embodiment.

Embodiment 3 (see FIG. 3) differs from Embodiment 1 in that the back surface of the natural stone panel 1 is attached to a rear panel 2 via a glue or is connected to the rear panel 2 via a connector. The rear panel 2 is provided with a light source 6 at a position corresponding to the counter-relief image 11. An electrical wire 9 connected to the light source 6 passes through an opening in the rear panel 2 and is connected to a power source 10 and a time controller 7. The time controller 7 controls the light source to periodically emit light. The power source 10 is an external power source.

Figure 4:
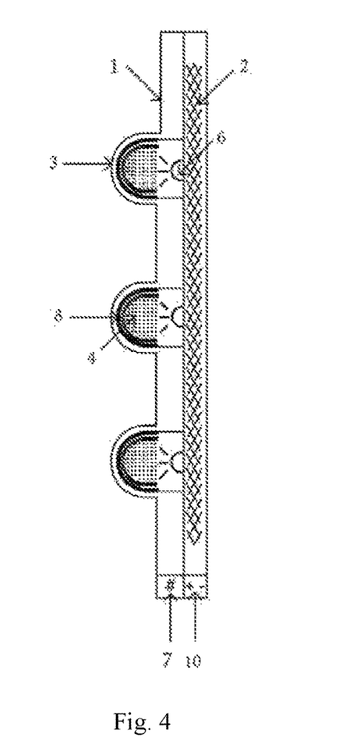
FIG. 4 is a schematic structural diagram of a natural stone relief decorative panel according to a fourth embodiment.

Embodiment 4 (see FIG. 4) differs from Embodiment 3 in that a pigment layer or a paint layer 8 is provided between the curable clear glue 4 and the counter-relief image 11. The electric wire 9 connected to the light source 6 passes through an etched slot in the rear panel 2 and is then connected to the power source 10 and the time controller 7. The time controller 7 controls the light source to periodically emit light. The power source 10 is a built-in power source.

Figure 5:
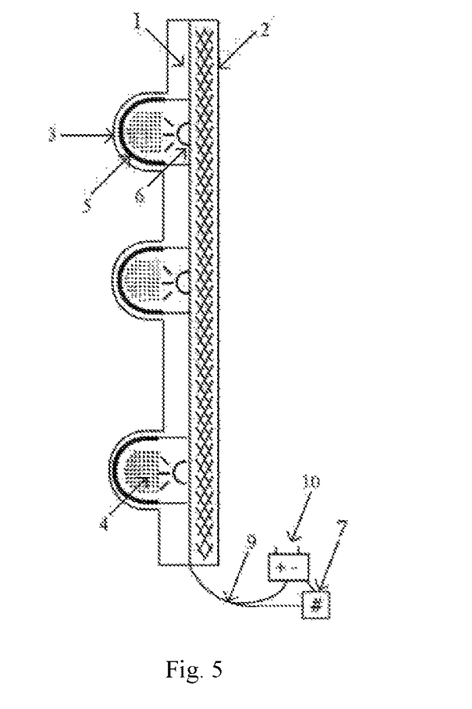
FIG. 5 is a schematic structural diagram of a natural stone relief decorative panel according to a fifth embodiment.

Embodiment 5 (see FIG. 5) is different from Embodiment 3 in that a photoluminescent material 5 is provided between the curable clear glue 4 and the counter-relief image 11.

Embodiment 6 (see FIG. 6) is different from Embodiment 3 in that a hole for mounting the light source 6 is provided on the rear panel 2 at a position corresponding to the counter-relief image. Specifically, a blind hole (namely a hole not penetrating through the rear panel) may be disposed on a side of the rear panel facing the stone panel, and the light source can be disposed in the hole. In this way, the counter-relief image may be fully filled with the clear glue and there is no need to reserve installation space for the light source. In addition, the light source in this case is further away from the surface of the relief image, which can effectively avoid occurrence of light spots on the surface of the relief image, thus improving the aesthetic effect of the product.

Embodiment 7 (see FIG. 7) is different from Embodiment 3 in that when the surface of the relief image is flat, the flat surface of the relief image can be polished before the production of the counter-relief image. Further, when the surface of the relief image does not need to be polished, the step of polishing may be omitted.

Embodiment 8 differs from Embodiment 3 in that before the counter-relief image is filled with the solidifiable glue, a stiffener is disposed in the counter-relief image. The stiffener is used for reinforcing the structure of the counter-relief image and the relief image. Preferably, the stiffener may be of any structure (not shown in the Figures), which may be metal strips, such as steel strips. Because the stiffener is provided in the counter-relief image, it does not affect the aesthetic effect of the relief image while reinforcing the structural strength of the relief image so that the relief image cannot be easily broken, thus saving costs.

Embodiment 9 differs from Embodiment 3 in that before the counter-relief image is filled with the curable clear glue, a heating unit (not shown in the Figures) is disposed in the counter-relief image and is then waterproofed. By providing a heating unit within the counter-relief image, the use of the natural stone relief decorative panel can be greatly expanded. For example, the natural stone relief decorative panel can be used for ground or table, etc., to give users a pleasant feeling.

In an embodiment of the present disclosure, the rear panel may be one of a tile, a cementitious panel, a glass panel, and a cellular panel. The curable clear glue may be an epoxy resin adhesive made of an epoxy resin and a curing agent. The light source may be an ultraviolet light-emitting diode.

Figure 8:
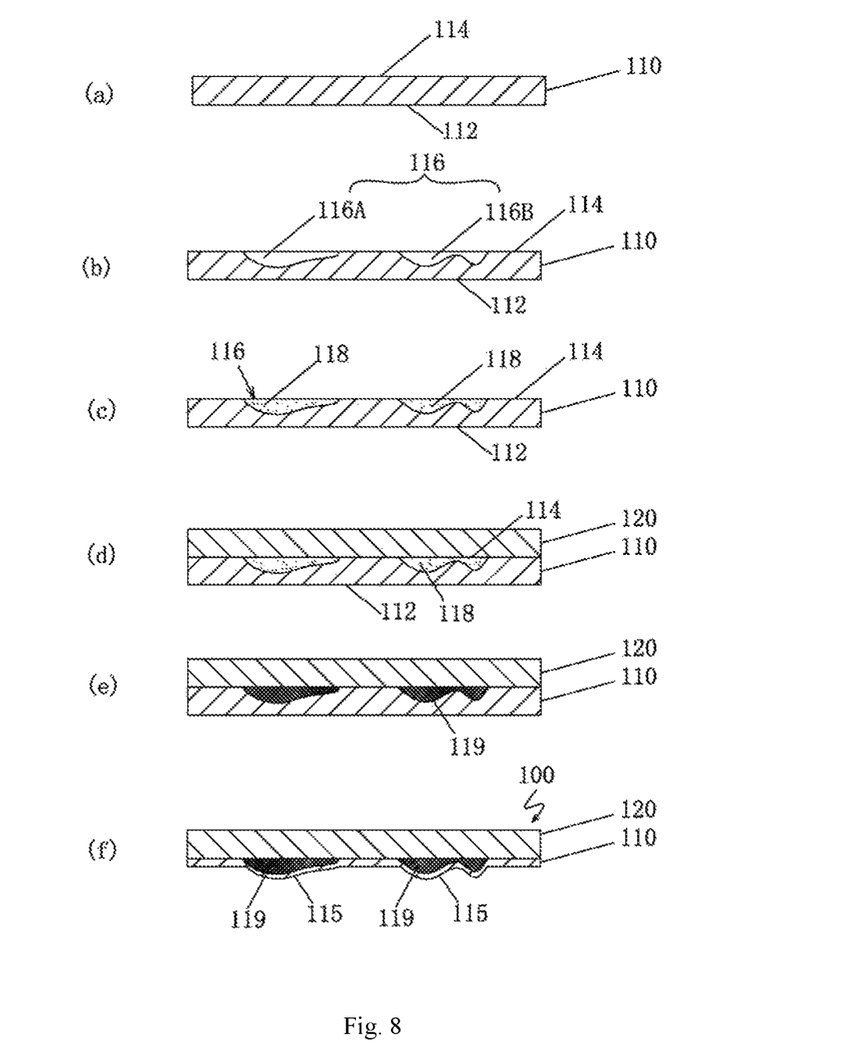
FIG. 8 is a schematic diagram illustrating a process of forming a composite stone panel, according to a further embodiment.

A further embodiment is related to a method of forming a composite stone panel 100, as illustrated in FIG. 8.

In this method, as illustrated in FIG. 8(*a*), a front panel 110 made of a natural stone is provided. The front panel 110 has a front side 112 and a back side 114. Initially, both the front 112 and back 114 of the natural stone may be generally flat, or pre-processed to be generally flat.

Optionally, the front 112 of the natural stone may be polished by any suitable polishing technique.

The natural stone is engraved from the back 114 to form a counter-relief 116, as illustrated in FIG. 8(*b*). As depicted, the counter-relief 116 may include two separate cavities 116A and 116B, or more separate or connected portions.

Next, counter-relief 116 is filled with a precursor 118 for forming a light-transmitting reinforcing filler, as illustrated in FIG. 8(*c*). The precursor 118 may be a curable adhesive material that when cured forms the light-transmitting filler. For example, the precursor 118 may include a liquid adhesive material, such as an epoxy resin, a polyurethane adhesive, or an unsaturated polyester resin adhesive. The precursor may also include a curing agent for curing the adhesive.

Optionally, a light source such as a light-emitting diode or a light guide (not shown in FIG. 8) may be disposed or mounted in the counter-relief 116 at this stage.

Optionally, other components, materials, or parts to be disposed or mounted in counter-relief 116 may also be placed in the counter-relief 116 at this stage. For example, such components or materials may include, one or more reinforcing bars, a photoluminescent material or a colorant, a heating element or heater, an electrical wire for connecting the light source to a power source, or the like.

In an optional embodiment, the back 114 may be attached, such as being bonded by a suitable adhesive material, to a backing panel 120 before the precursor 118 is cured, as illustrated in FIG. 8(*d*). The backing panel 120 may include a tile, a cementitious panel, a glass panel, or a cellular panel. The material and size of backing panel 120 may be selected to provide the desired support and backing for the front panel, particularly the natural stone. The backing panel 120 may also be configured to provide housing or support for various parts and components to be attached to or mounted on the composite stone panel, depending on the particular use and application of the composite stone panel 100.

The precursor 18 may be cured in any suitable manner as can be appreciated by those skilled in the art. For example, curing may be triggered or facilitated by heating, upon mixing of a resin with a curing agent, by radiation, or the like.

As illustrated in FIG. 8(*e*), after the precursor 118 is cured, it forms a solid reinforcing filler 119 that fills the available space in counter-relief 114 and is bounded to the surface of the natural stone. The filler material (and necessarily its precursor 116) is selected such that the filler material reinforces and strengthens the natural stone during further processing, particularly when the front 112 of the natural stone is carved to form the desired relief as will be further described below. The reinforcing filler 119 is also light-transmitting so that light emitted from a light source at the back or in the counter-relief 116 can be transmitted through the natural stone to illuminate the relief. In some embodiments, the reinforcing filler may be transparent. In other embodiments, the reinforcing filler 119 may be translucent.

As alluded to above, it is possible to cure the precursor 118 before attaching the backing panel 120 to the back 114 of front panel 110. However, attaching the backing panel 120 to the front panel 110 before curing may be convenient, as the backing panel may help to contain and shaping the precursor during the curing process. Further, if additional materials or parts are disposed in the counter-relief 116 before curing as noted above, the attached backing panel 120 can provide support and limit movement of these parts and materials.

After the counter-relief is filled and supported by the reinforcing filler 119 and further supported by the backing panel 120, the front 112 of the natural stone may be conveniently carved to form relief 115, at a location opposite to the counter-relief 116, as illustrated in FIG. 8(*f*). In fact, the counter-relief 116 is designed and formed based on the desired relief 115 on the front 112. Since the natural stone in the front panel 110 is reinforced by the reinforcing material 119 and supported by the backing panel 120, the risk or likelihood of breakage of the natural stone during curving is reduced, and it is possible to leave a relatively thin stone layer between the counter-relief 116 and the relief 115.

The front surface of relief 115 and front 112 may be polished by a suitable polishing technique, as described elsewhere herein. For example, the front surface may be treated with a chemical solution that polishes the surface. Manual or machine buffering or sanding may also be applied in some embodiments.

Thus, the formed composite stone panel 100 includes front panel 110 attached to backing panel 120. The front panel 110 incudes natural stone and has a front 112, and a back 114 attached to the backing panel 120. The front 112 incudes relief 115. The back 114 incudes counter-relief 116, which is opposite to relief 115 and filled with light-transmitting reinforcing filler 119 bonded to the natural stone.

Figure 9:
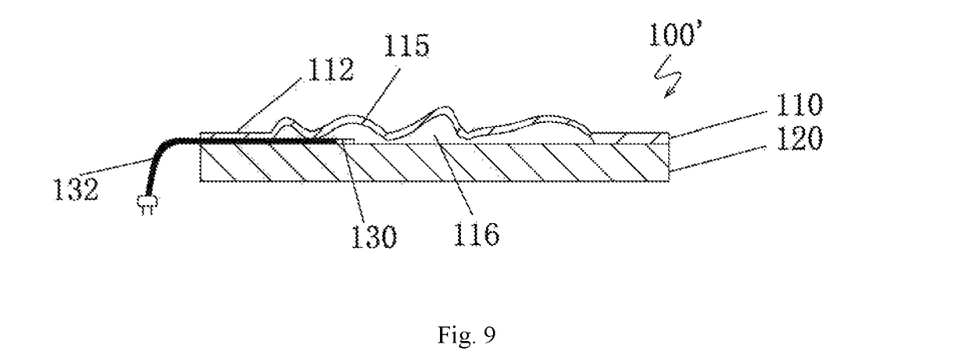
FIGS. 9, 10 and 11 are schematic views of different variations of the composite stone panel, according to different embodiments.
Figure 10:
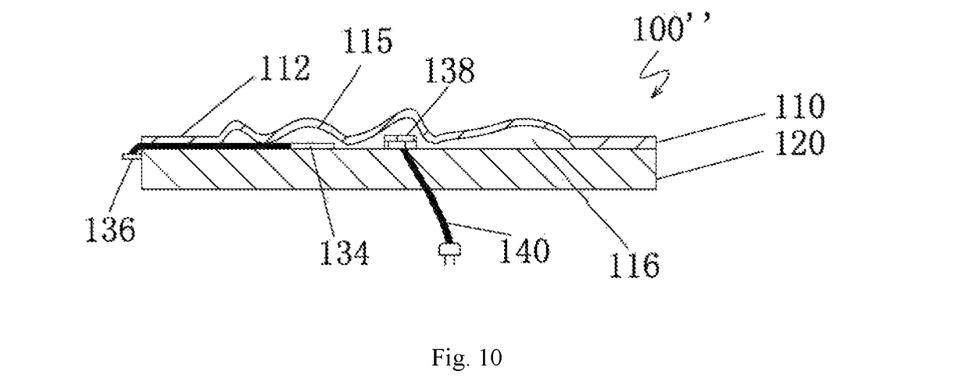
Figure 11:
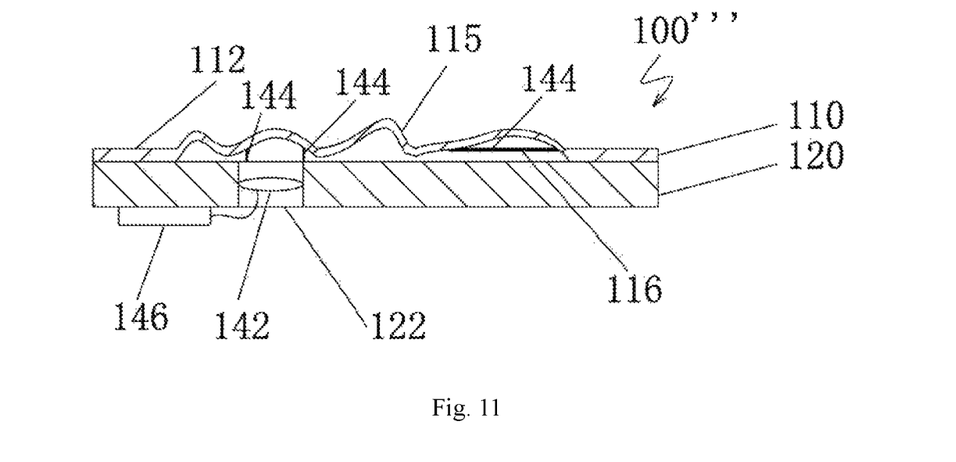

As noted above, in alternative embodiments, composite stone panel 100 may include a light source configured and positioned for illuminating relief 115 through counter-relief 116, as illustrated in FIGS. 9, 10 and 11.

FIG. 9 schematically illustrates an embodiment of the composite stone panel 100' where a light source 130, such as a LED, is mounted in counter-relief 116, and an electrical wire 132 is provided for connecting the light source 130 to a power source (not shown), such as a battery, a power adapter, or a wall electrical outlet. During the manufacturing process, light source 130 may be disposed in the counter-relief 116 before the precursor 118 is cured, and may be mounted on the front side of backing panel 120.

FIG. 10 schematically illustrates another embodiment of the composite stone panel 100" where a light guide 134 is mounted in counter-relief 116 and connected to a light source 136 positioned away from the counter-relief 116. As depicted in FIG. 10, the light source 136 may be mounted at an edge of the backing panel 120.

Optionally, a heater 138 may be provided in counter-relief 116 and an electrical connection 140 may be provided for connecting the heater 138 to a power source (not shown). The heater 138 may be useful, for example, when the composite store panel is used to form a floor, so as to provide a warmed floor surface.

In another embodiment of the composite stone panel 100''', as illustrated in FIG. 11, the backing panel 120 may include an opening 122 for receiving a light source 142, which may be mounted on backing panel 120 as depicted. Optionally, one or more reinforcing bars 144 may be disposed or mounted in counter-relief 116 to provide further reinforcement. The reinforcing bars 144 may be formed of a suitable metal, plastic, or other materials. In this case, the opening 122 is aligned with relief 115 and counter-relief 116 so that the light source 142 can illuminate relief 115 when the light is turned on. A battery holder 146 may be mounted on backing panel 120, to hold a battery (not shown) for powering the light source 142 when the battery is mounted in the battery holder 146 and connected to the light source 142 during use.

It should be noted that while FIGS. 8-11 depict relief 115 with a curved front surface, in different embodiments a relief or at least a portion of a relief may have a flat or curved surface.

In summary, some of the beneficial effects of embodiments disclosed herein may include: after production of the counter-relief image on the natural stone panel, the counter-relief image is filled with the curable clear glue, which can ensure that when the relief image corresponding to the counter-relief image is produced, the relief image cannot be easily broken, and that the light emitted by the light source on the back surface of the natural stone panel can be transmitted out of the relief on the front surface of the natural stone panel. In addition, in order to further avoid fracturing of the relief image, a stiffener may be provided in the counter-relief image. Furthermore, the use of the natural stone relief decorative panel can be greatly expanded by providing a heating unit in the counter-relief image.

It should be understood that those skilled in the art may make modifications or alterations according to the above description, and all such modifications and variations shall fall within the scope of protection of the appended claims of the present disclosure.

Although the present invention has been described with reference to preferred embodiments, various modifications may be made thereto and components therein may be replaced with equivalents without departing from the scope of the present invention. In particular, the technical features mentioned in the respective embodiments may be combined in any manner as long as there is no structural conflict. The present invention is not limited to the specific embodiments disclosed herein, but includes all technical solutions falling within the scope of the claims.

The invention claimed is:

1. A manufacturing method of composite stone panel, comprising:
   providing a composite stone panel comprising a front panel and a backing panel, wherein the front panel comprises natural stone having a front and a back, the back of the front panel comprises a counter-relief filled with a light-transmitting reinforcing filler, and the backing panel is attached to the back of the front panel; and
   carving the natural stone from the front of the composite stone panel to form a relief at the front positioned opposite to the counter-relief at the back of the natural stone.

2. The manufacturing method of composite stone panel of claim 1, wherein said providing the composite stone panel comprises:
   engraving the back of the natural stone to form the counter-relief;
   filling the counter-relief with the light-transmitting reinforcing filler and bonding the light-transmitting reinforcing filler to the natural stone; and
   attaching the backing panel to the front panel.

3. The manufacturing method of composite stone panel of claim 2, comprising filling the counter-relief with a curable light-transmitting adhesive material and curing the adhesive material to form the light-transmitting reinforcing filler and bond the light-transmitting reinforcing filler to the natural stone.

4. The manufacturing method of composite stone panel of claim 3, comprising curing the adhesive material in the counter-relief before attaching the backing panel to the front panel.

5. The manufacturing method of composite stone panel of claim 3, wherein the adhesive material comprises an epoxy resin, a polyurethane adhesive, or an unsaturated polyester resin adhesive, and further comprises a curing agent.

6. The manufacturing method of composite stone panel of claim 1, wherein the front panel and the backing panel are bonded to each other by an adhesive.

7. The manufacturing method of composite stone panel of claim 1, further comprising polishing the relief.

8. The manufacturing method of composite stone panel of claim 1, further comprising polishing the front of the natural stone before carving the natural stone to form the relief at the front.

9. The manufacturing method of composite stone panel of claim 7, wherein said polishing comprises treating a front surface of the natural stone with a chemical solution.

10. The manufacturing method of composite stone panel of claim 1, comprising disposing a light source or a light guide in the counter-relief for illuminating the relief.

11. The manufacturing method of composite stone panel of claim 1, comprising disposing a photoluminescent material or a colorant in the counter-relief.

12. The manufacturing method of composite stone panel of claim 1, wherein the light-transmitting reinforcing filler is transparent.

13. The manufacturing method of composite stone panel of claim 1, further comprising disposing a reinforcing bar in the counter-relief for reinforcing the natural stone, before the counter-relief is filled with the light-transmitting reinforcing filler.

14. The manufacturing method of composite stone panel of claim 1, wherein the backing panel comprises a tile, a cementitious panel, a glass panel, or a cellular panel.

15. A composite stone panel comprising:
   a front panel comprising natural stone and having a front and a back; and
   a backing panel attached to the back of the front panel;
   wherein the front of the front panel comprises a relief, the back of the front panel has a counter-relief opposite to the relief at the front, the counter-relief filled with a light-transmitting reinforcing filler.

16. The composite stone panel of claim 15, further comprising a light source configured and positioned for illuminating the relief through the counter-relief.

17. The composite stone panel of claim 16, wherein the light source is disposed in the counter-relief, or the front panel comprises a light guide disposed in the counter-relief and connected to the light source.

18. The composite stone panel of claim 15, further comprising a photoluminescent material or a colorant in the counter-relief.

19. The composite stone panel of claim 15, further comprising a reinforcing bar in the counter-relief.

20. The composite stone panel of claim 15, wherein the light transmitting reinforcing filler is formed of a cured epoxy resin, polyurethane adhesive, or unsaturated polyester resin adhesive.

* * * * *